United States Patent [19]
Tezuka et al.

[11] 3,939,663
[45] Feb. 24, 1976

[54] OIL FENCE HAVING DIRECTIONAL CONTROL DEVICE

[75] Inventors: Toshiyata Tezuka; Hiroshi Kawakami, both of Kamakura; Katsutoshi Miura, Yokohama, all of Japan

[73] Assignee: Bridgestone Tire Company, Ltd., Tokyo, Japan

[22] Filed: Sept. 27, 1974

[21] Appl. No.: 509,888

[30] Foreign Application Priority Data
Sept. 28, 1973  Japan .................. 48-112300[U]

[52] U.S. Cl. .................................................. 61/1 F
[51] Int. Cl.² ........................................ E02B 15/04
[58] Field of Search.... 61/1 F, 5; 210/242, DIG. 21; 114/1 F

[56] References Cited
UNITED STATES PATENTS

| | | | |
|---|---|---|---|
| 3,579,994 | 5/1971 | Preus et al. ........................ | 61/1 F |
| 3,688,506 | 9/1972 | Marcocchio ........................ | 61/1 F |

OTHER PUBLICATIONS
Ocean Industry of June 1970 p. 54.

*Primary Examiner*—Jacob Shapiro
*Attorney, Agent, or Firm*—Sughrue, Rothwell, Mion, Zinn & Macpeak

[57] ABSTRACT

An oil fence having a directional control device consisting of rudder plates or wind receiver plates secured to vertical plates or skirts of the fence at an angle thereto, which are subjected to a force due to relative movement of water or wind to cause the fence to position at an angle relative to the direction of the movement of the water or wind, whereby when the oil fence is being tugged by a towing boat the oil fence line is positioned at an angle without being subjected to any bending moment or any other undue force so as to collect or recover pollutants, e.g., spilt oil effectively from water surface.

4 Claims, 10 Drawing Figures

FIG_1
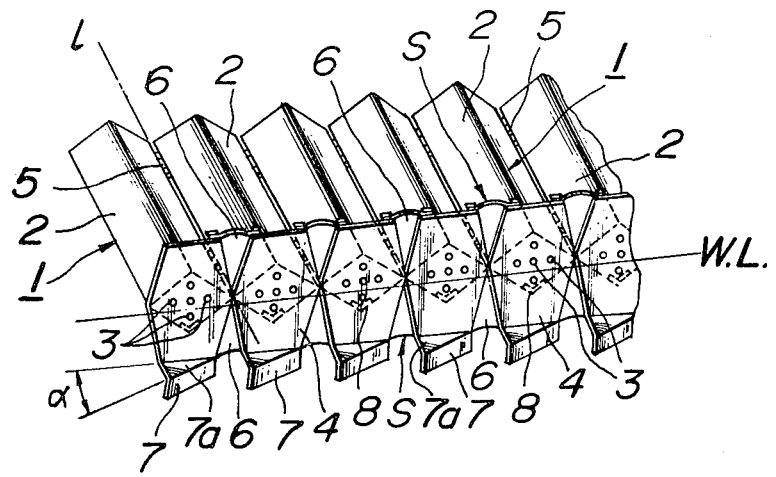
FIG_2
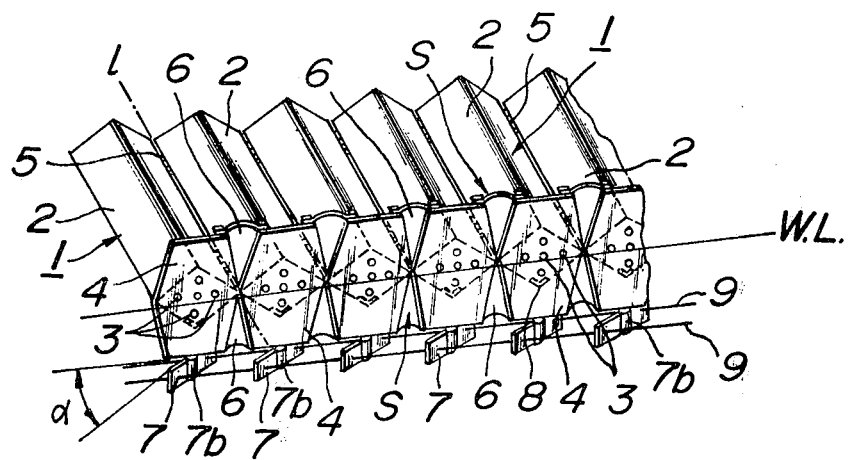

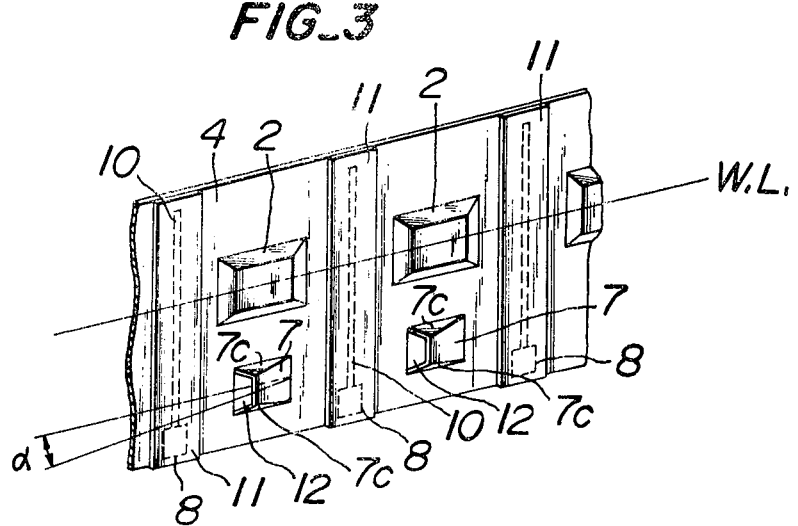
FIG._3
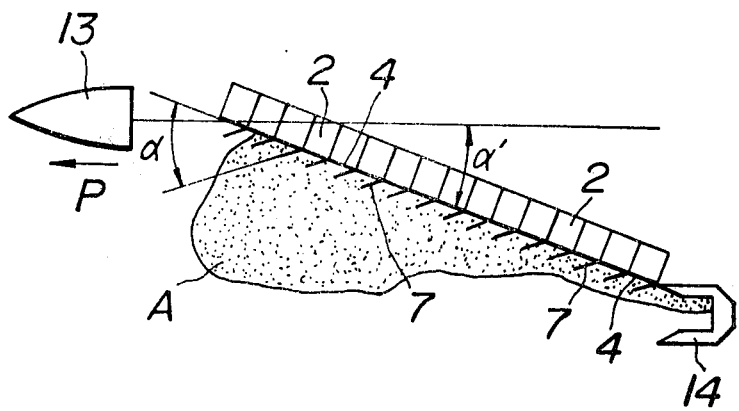
FIG._4
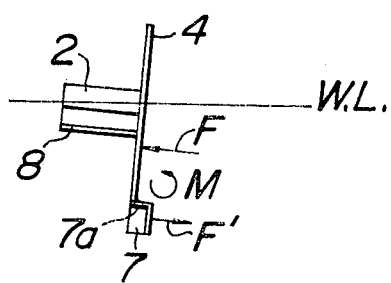
FIG._5

FIG_6
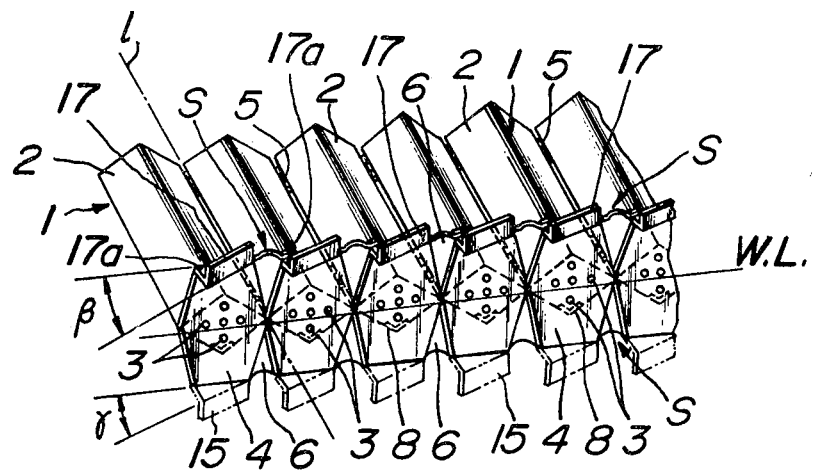
FIG_7
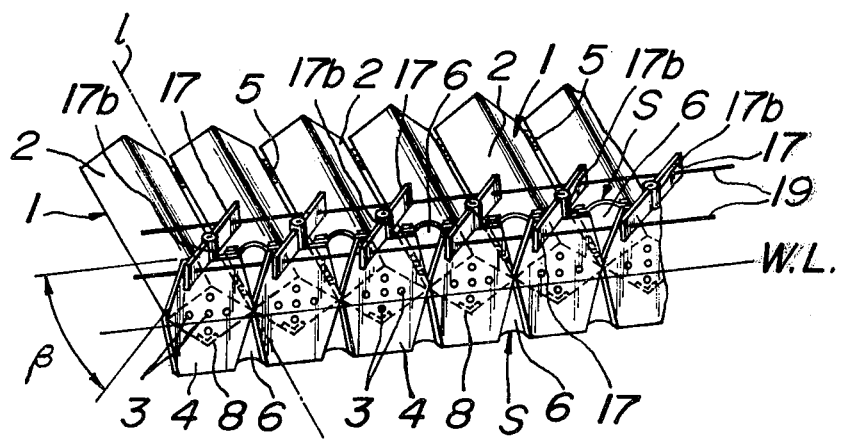

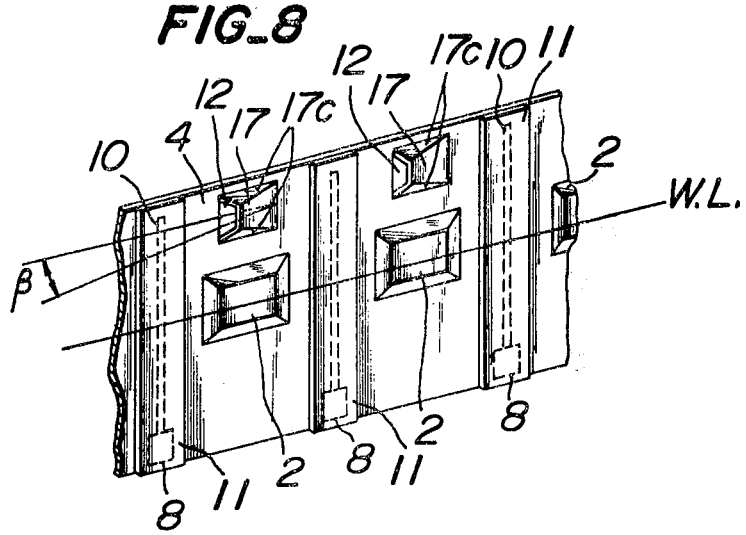
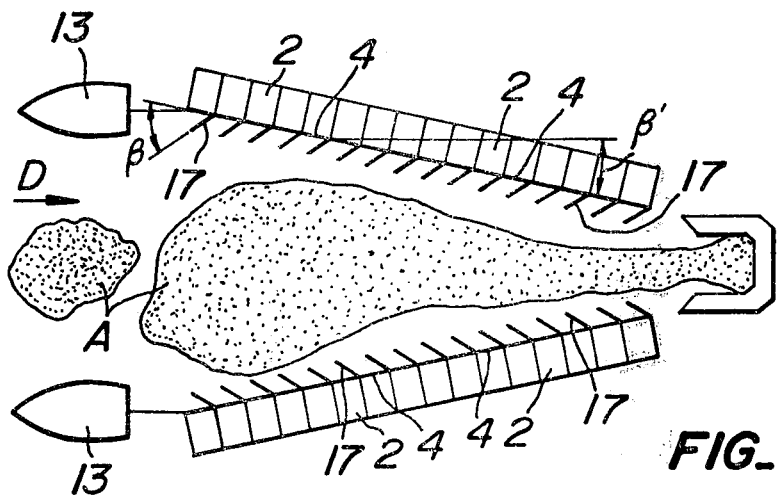
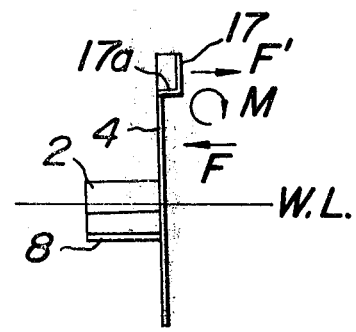

OIL FENCE HAVING DIRECTIONAL CONTROL DEVICE

BACKGROUND OF THE INVENTION

1. Field of the Invention

This invention relates to an oil fence adapted to be tugged by a boat for recovering or collecting pollutants, e.g., spilt oil, from water surface.

2. Description of the Prior Art

In order to collect spilt oil or other pollutant from water surface, an oil fence has been used which is laid between a tug boat and a collector to recover the floating matter which spreads over a greatly wide area or to introduce it into the collector by turning its flowing direction. In this case, it is usual to position the oil fence line at an angle to a towing direction of the boat. When a prior art oil fence is used in this manner, there is a tendency for the fence to be subjected to a bending moment in a horizontal plane owing to water flow or wind force. Accordingly, the length of the oil fence line will be limited to an unsatisfactory value unless the oil fence is strengthened sufficiently to resist the bending moment. There is also a tendency for skirts or vertical members of the fence to be tilted forwardly due to a component of water flow force (perpendicular to the plane of the skirts) or rearwardly due to a component of wind force (perpendicular to the plane of the skirts), permitting the floating matter to escape through under the oil fence.

SUMMARY OF THE INVENTION

An object of the invention is, therefore, to provide an oil fence which eliminates the drawbacks of the prior art oil fences.

A further object of the invention is to provide an oil fence adapted to be positioned at an angle to its towing direction by utilizing water flow or wind force acting upon rudder plates or wind receiver plates without being subjected to any bending moment or any other undue force to collect or recover pollutants effectively from water surface.

According to the invention the oil fence comprises a vertical plate, a float fixed to one side of said vertical plate, a flexible connecting means attached to said vertical plate and connecting between said vertical plates in a water-tight manner and directional control means attached to said vertical plate at an angle thereto thereby directing said floating oil fence at a suitable angle to a direction towing said fence by applying a tractive force so as to collect said floating pollutants.

A preferred embodiment of the invention, said directional control means are rudder plates fixed to lower portions of said vertical members of the fence at an angle thereto.

Another embodiment of the invention, said directional control means are wind receiver plates fixed to upper portions of the vertical members of the fence at an angle thereto.

BRIEF DESCRIPTION OF THE DRAWINGS

These and other objects, features and advantages of the invention will become more apparent upon a reading of the following detailed specification and drawings, in which:

FIG. 1 is a schematic perspective view of an oil fence according to the invention;

FIG. 2 is a schematic perspective view of an oil fence capable of adjusting its rudder plates according to the invention;

FIG. 3 is a schematic perspective view of a preferred embodiment of the invention employing rudder plates fixed around openings formed in a skirt of the oil fence;

FIG. 4 is a schematic plan view illustrating a used condition of the oil fence as shown in FIGS. 1–3;

FIG. 5 is a sectional view of the oil fence as shown in FIG. 3 showing the forces acting on the skirt of the fence;

FIG. 6 is a schematic perspective view of an oil fence of a preferred embodiment of the invention employing wind receiver plates;

FIG. 7 is a schematic perspective view of an oil fence according to the invention employing adjustable wind receiver plates;

FIG. 8 is a schematic perspective view of a preferred embodiment of the invention employing wind receiver plates fixed around openings formed in a skirt of the oil fence;

FIG. 9 is a schematic plan view illustrating a used condition of the oil fence as shown in FIGS. 6–8; and FIG. 10 is a sectional view of the oil fence as shown in FIG. 8 showing forces acting on the skirt.

DESCRIPTION OF THE PREFERRED EMBODIMENTS

Referring now to the drawings, and particularly to FIG. 1, there are shown oil fence units generally designated by the numeral 1, each consisting of hollow prism-shaped floats 2 made of a high rigid sheet material such as aluminum sheet, a skirt 4 made of a high rigid sheet material such as aluminum fixed to one end of the float 2 by bolts 3 schematically shown in the drawing and a weight member 8 in the form of an angled member fixed to a bottom of the float 2. A number of the oil boom units are connected side by side to form an oil fence line. The floats 2 are aligned with each other, adjacent floats of which are connected by means of by one or more pivot means 5 such as hinges, permitting the floats to swing about axes $l$ substantially perpendicular to the plane of the skirts 4. On the other hand, the relative movement of the adjacent floats 2 in parallel with the aforesaid axis $l$ is prevented by the pivot means 5. To allow the relative swinging of the adjacent oil fence units 1, a suitable spacing S should be provided between the skirts 4 of the units as shown in FIG. 1. To close such gap S against leakage of floating matters such as spilt oil, a flexible membrane 6 is attached to the adjacent skirts 4. The membrane may be made of a rubber coated cloth or a water-repellent asbestos cloth. Thus, a continuous wall is formed on the water surface by the skirts 4 and the flexible membranes 6 which wall inhibits the floating matter from moving thereacross.

According to the invention, there is provided at the bottom of the each skirt 4 with a rudder plate 7 made of a rigid material such as aluminum in order to control the direction of the fence line relative to the direction of relative movement of water. The rudder plate 7 is fixed to the bottom of the skirt 4 by any suitable means as bolts or welding through a triangular leg 7a formed integrally with and at right angles to the rudder plate to form an angle $\alpha$ between the plate and the plane of the skirt. The rudder plate 7 and leg 7a may be formed integrally with the skirt 4. The rudder plates serve to position the fence line at an angle relative to the advancing direction thereof by the action of water.

FIG. 2 illustrates another embodiment of the invention which in order to control the direction of the fence line employs a movable rudder plate 7 made of a rigid material provided at the bottom of each skirt 4 of an oil fence which is the same as that shown in FIG. 1. The skirt 4 is provided at its lower end with a pivot shaft extending downwardly on which is rotatably fitted a tubular portion 7b provided in the middle of the rudder plate 7, permitting the angle $\alpha$ between the plate 7 and the plane of the skirt to be variable. The angle $\alpha$ between the plate and the skirt can be set or changed by pulling or loosening wire ropes or steel ropes 9 passing through and fixed to the plates 7 on both sides of the tubular portions 7b depending on desired angles between the oil fence line and a cruising direction of a towing boat for the fence.

Referring to FIG. 3 showing a further embodiment of the invention, an oil fence consists of a skirt 4 of a flexible material such as rubber coated cloth, floats 2 made of a light weight material such as foamed material arranged on one side or both sides of the skirt spaced apart at a suitable interval along a longitudinal direction of the skirt 4 and sets of a rod 10 and a weight member 8, each set of the rod 10 and the weight member 8 fixed to the skirt by a fixing cloth 11 spaced apart at a suitable interval along a longitudinal direction of the skirt by means of adhesion and riveting. In order to control the direction of the oil fence, the skirt is formed in the lower portion with a plurality of openings 12 at a suitable interval along a longitudinal axis of the skirt, permitting water to flow therethrough, around which openings 12 are fixed rudder plates 7 made of a rigid material by means of triangular legs 7c substantially perpendicular thereto and formed integrally therewith so that the respectiv rudder plates are positioned at an angle $\alpha$ relative to the plane of the skirt. Means for securing the legs to the skirt may be adhesion and riveting.

With the oil fences as above described according to the invention, the oil fence line is kept at a desired angle $\alpha'$ relative to its advance direction P only by pulling it by means of a towing boat 13 as shown in FIG. 4 thereby enabling the oil fence having a constant entire length to collect matters floating in a more wide area. Moreover, even if a collector 14 is employed at the rear end of the oil fence line, the oil fence will be not subjected to an excessive force in a horizontal plane so that the oil fence line can be lengthened sufficiently to collect the floating matter A more effectively. When the fence is towed, the skirt will be subjected to a force F due to the resistance of water which causes the skirt to be tilted forwardly as shown in FIG. 5. However, the rudder plates 7 are subjected to a force F' due to resistance of water, so that a moment M consisting of the forces F and F' serves to keep the skirt in its vertical position to collect and prevent the floating matter A from escaping therefrom more effectively.

FIG. 6 illustrates another embodiment of the invention in which the oil fence is provided with wind receiver plates 17 instead of the rudder plates as in the embodiments previously described. In the drawing, the like reference numerals designate like or corresponding parts to those in FIG. 1. In the embodiment, in order to control the direction of the fence line, the skirt 4 is provided at the upper end with the wind receiver plate 17 made of a rigid material as aluminum or the like which is at an angle $\beta$ relative to the plane of the skirt and is fixed to the upper end of the skirt by means of any means as bolts or welding through a triangular leg 17a formed integrally with and at right angles to the wind receiver plate to form an angle $\beta$ between the plate 17 and the plane of the skirt. The wind receiver plates serve to position the fence line at an angle relative to the moving direction of air.

FIG. 7 illustrates a modification of the oil fence shown in FIG. 6, which employs a movable wind receiver plate 17 made of a rigid materials such as aluminum at the uppper end of each skirt 4 of the fence which is the same as that shown in FIG. 1 or 6. The skirt 4 is provided at its upper end with a support shaft extending upwardly on which is rotatably fitted a tubular portion 17b provided in the middle of the wind receiver plate 17, permitting the angle $\beta$ between the plate 17 and the plane of the skirt to be variable. The angle $\beta$ can be set or changed by pulling or loosening wire ropes or steel ropes 19 passing through and fixed to the plates 17 on both sides of the tubular portions 17b depending on desired angles between the oil fence line and a cruising direction of a towing boat for the fence.

Referring to FIG. 8 showing another embodiment of the invention, an oil fence consists of a skirt 4 of a flexible material such as rubber coated cloth, floats 2 made of a light weight material such as foamed material arranged on both sides of the skirt spaced apart at a suitable interval along a longitudinal direction of the skirt 4 and sets of a rod 10 and a weight member 8 fixed to the skirt 4 by a fixing cloth 11 spaced apart at a suitable interval along a longitudinal direction of the skirt by means of adhesion and riveting. In order to control the direction of the oil fence, the skirt is formed in the upper portion with a plurality of openings 12 at a suitable interval along a longitudinal axis of the skirt, permitting wind to pass therethrough, around which openings 12 are fixed wind receiver plates 17 of a rigid material such as aluminum by means of triangular legs 17c substantially perpendicular thereto and formed integrally therewith so that the respective wind receiver plates are positioned at an angle $\beta$ relative to the plane of the skirt. Means for securing the legs to the skirt may be adhesion and riveting.

With the oil fences as shown in FIGS. 6–8, the oil fence line is ketp at a desired angle $\beta'$ relative to a direction of wind D only by anchoring one end of the oil fence line to the towing boat 13 thereby enabling the oil fence having a constant entire length to collect the matter A floating in a wider area. Moreover, if a collector 14 is provided at the other end of the oil fence line, the oil fence will be not subjected to an excessive force in a horizontal plane so that the oil fence line can be lengthened sufficiently to collect the floating matter A more effectively. The skirt will be subjected to a force F of the wind which causes the skirt to be tilted backwardly as shown in FIG. 10. However, the wind receiver plates 17 are subjected to a force F' of the wind, so that a moment M consisting of the forces F and F' serves to keep the skirt in its vertical position to ensure more effective collection of the floating matter A.

The oil fences having the wind receiver plates 17 as shown in FIGS. 6–8 are suitable to be used under a condition where a wind force is more effective than a relative water movement. In a more preferable embodiment of the invention, the skirt having the wind receiver plates 17 is further provided at the lower end with rudder plates 15 at a suitable angle γ to the plane of the skirt, thereby controlling the wind force and water movement relative to the oil fence to form a more effective oil fence line.

It is further understood by those skilled in the art that the foregoing description is preferred embodiments of the invention and that various changes and modifications may be made in the invention without departing from the spirit and scope thereof.

What is claimed is:

1. A floating oil fence for collecting floating pollutants from the water surface comprising:
    a plurality of vertical skirt members, each of said members separating in proximity to the water surface;
    a flexible membrane attached to said vertical skirt members and connecting them in a water tight manner;
    a float associated with each of said vertical skirt members to float said skirt members on the water surface;
    directional control means including rudder plates at a suitable angle to a plane of said vertical skirt and substantially perpendicular to the water surface, said control means being arranged on a portion of said vertical skirt under said water surface; and,
    wherein said control means prevent said vertical skirt from being tilted by relative movement of the water caused by a towing of said oil fence or by the natural flow of said water, said control means thereby maintaining said fence in a longitudinal direction at a determined orientation.

2. An oil fence as set forth in claim 1, wherein each rudder plate consists of a rudder plate member and a triangular leg formed integrally with and at right angles to the skirt member fixed to a lower portion of the vertical skirt member of the fence.

3. An oil fence as set forth in claim 1, wherein said directional control means are movable rudder plates each comprising a rudder plate member having at its center a tubular portion fitted on a pivot shaft extending downwardly from the vertical skirt member of the fence.

4. An oil fence as set forth in claim 1, wherein said directional control means comprises a plurality of openings formed in a lower portion of the vertical skirt member of the fence at an interval along a longitudinal axis of the vertical member and rudder plates fixed to said vertical skirt member around said openings by means of triangular legs substantially perpendicular to and formed integrally with said plates so that said rudder plates are positioned at an angle relative to a plane of the vertical skirt member.

* * * * *